United States Patent [19]

O'Connell et al.

[11] Patent Number: 5,398,234

[45] Date of Patent: Mar. 14, 1995

[54] DS-0 LOOP-BACK DETECTION ON A DS-1 LINE

[75] Inventors: Anne O'Connell; John Hickey, both of Galway; John Byrne, County Monaghan, all of Ireland

[73] Assignee: Digital Equipment Corporation, Maynard, Mass.

[21] Appl. No.: 130,331

[22] Filed: Oct. 1, 1993

[30] Foreign Application Priority Data

Oct. 21, 1992 [IE] Ireland ............................ 922760

[51] Int. Cl.[6] .......................................... H04J 3/14
[52] U.S. Cl. ................................. 370/15; 370/110.1
[58] Field of Search .............. 370/15, 79, 99, 110.1

[56] References Cited

U.S. PATENT DOCUMENTS 4,958,342  9/1990  Williams et al. .................. 370/79

Primary Examiner—Douglas W. Olms
Assistant Examiner—Min Jung
Attorney, Agent, or Firm—Kenneth F. Kozik

[57] ABSTRACT

Loop-back detection and signalling is achieved on any DS-0 channel that conforms to 56 kbps operation such as DDS in a DS-1 digital data transmission system. A standard DS-1 chip set (line interface unit, framer, and link layer controller) is used, coupled to 24 transmit and receive buffer means in the customer main memory. The framer detects control bits by using Channel Associate Signalling, (designed for digitising voice in-band signalling and not normally used for data transmission), in the incoming signal and interrupts the customer CPU, which determines from the framer which channel caused the interrupt, changes the mode of the relevant channel, checks that channel's receive buffer means for loop-back codes, and, if enough successive loop-back codes are found, copies the receive buffer means into the transmit buffer means (with code mapping) for as long as the loop-back condition exists.

16 Claims, 2 Drawing Sheets

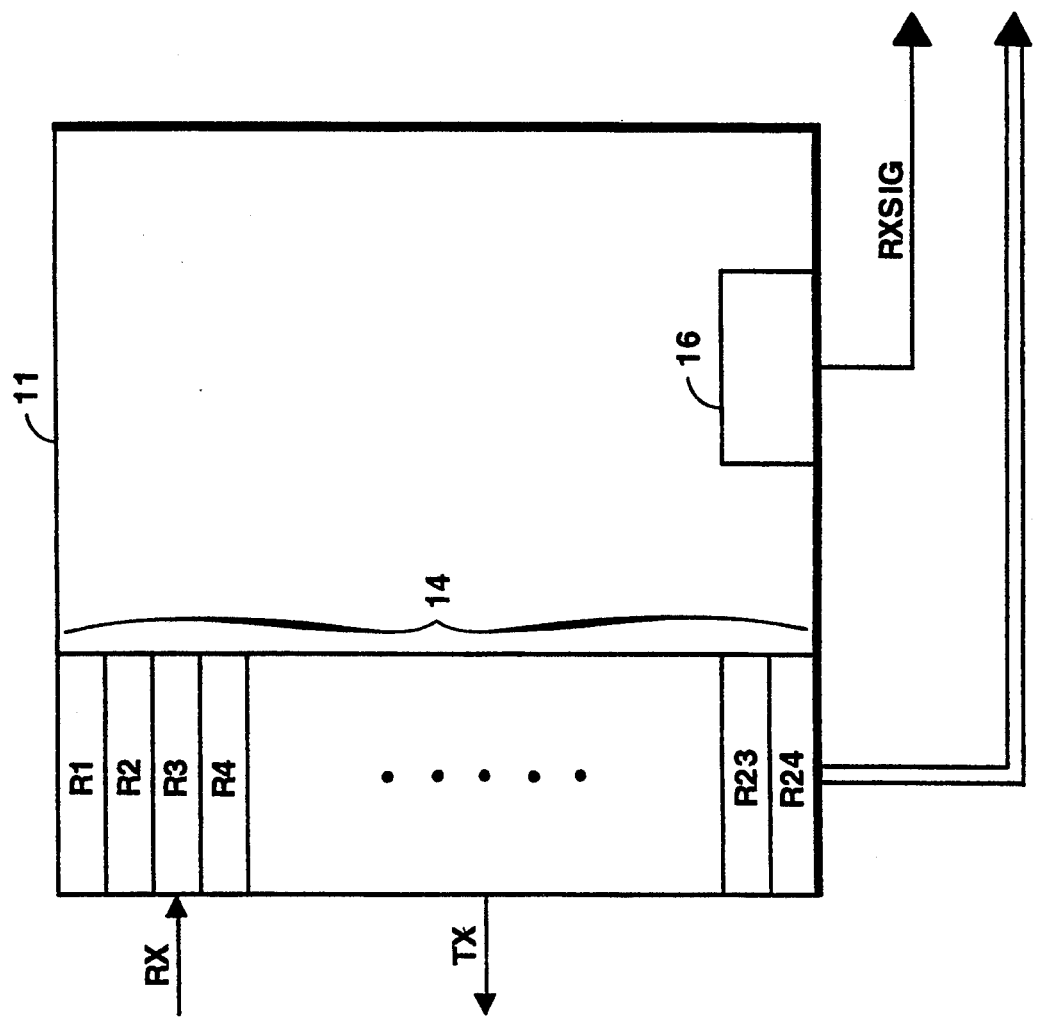

DS-0 LOOP-BACK DETECTION ON A DS-1 LINE

The present invention relates to digital telephone signalling, and more specifically to circuit loop-back testing.

Digital telephone systems were originally developed for audio transmission, with the voice signal being sampled at an 8 kHz rate and each sample encoded into 8 bits at the transmission end and decoded back into an analog signal at the receiving end. This is a single-channel system (termed DS-0) operating at 64 kbit/sec, with 8-bit digital words (so that the word rate is 8000/sec, with each word occupying 125 µs). The system includes customer premises equipment (CPE) unit at each end of the line, to convert the signal into conformity with the telephone system standard for transmission and to convert it back again for feeding to the receiving device.

In a simple audio telephone system, it is also necessary to carry certain control signals, such as on-hook, off-hook and busy. These signals are carried within the voice channel, as the least significant bit of every 6th word. This technique is known as robbed bit or channel associated signalling (CAS). The least significant bit of every 6th sample therefore stands a 50% chance of being wrong when the digital signal is converted back into analog form. This produces a distortion of the audio signal, but the distortion is wholly insignificant. Systems operating at 64 kbit/sec are known as DS-0.

However, digital telephone systems have long been used for transmitting purely digital information, e.g. information generated by computer systems. The system just described can be used directly for this purpose. However, there are two problems. One is that the robbed bit signalling technique for control signals cannot be used, because even signal bit errors are generally not tolerable. The other is that the system generally requires 1 s at at least some minimal rate, to maintain its synchronisation, while it is quite possible for digital data to include arbitrarily long stretches of Os. (In a voice system, it is relatively easy to ensure that long stretches of Os do not occur).

These two problems are both solved by using the 8th bit of every word as a control bit, which is forced to 1 for normal digital data transmission. If the control bit is 0, the system changes from the normal data transmission mode to a control mode. Such a system operates effectively at 56 kbit/sec; one implementation of this is the DATAPHONE Digital Service (DDS).

Such a system supports line testing by means of certain special test codes. These test codes are inserted by the carrier using appropriate test equipment; and detected at the receiving end detection circuitry included in the CPE at the receiving end.

The 8th bit (effectively the least significant bit) of each word is a network control bit which indicates whether the word is a data word (LSB=1) or a code word (LSB=0). This can conveniently be achieved by providing a storage register in the CPE which stores incoming words and a control circuit including a latch which is set if the LSB is 0.

One of the required test functions is loop-back. When the detection circuitry detects a loop-back code, subsequent incoming digital words are stored in the storage register and transmitted back along the line. The test circuitry in the CPE at the transmitting end then compares the received signal with the transmitted signal, to check the nature and quality of the transmission over the line for as long as the loop-back function is maintained.

The loop-back function can be initiated by several code words, depending on the precise nature of the required loop-back. The following table gives the codes:

| Device | Mnemonic | Receive Code | Mapped Code |
| --- | --- | --- | --- |
| Office Channel Unit | OCU | C0101010 | C0100001 |
| Data Service Unit | DSU | C0101100 | C0100001 |
| Channel Service Unit | CSU | C0101000 | C0101001 |

(In the codes, C indicates the control bit).

It will be seen that the loop-back code word is mapped, i.e. it is changed to the mapped version before being returned.

There are other control codes, but those are optional and are not relevant for present purposes.

The systems described so far are single-channel systems, using a single transmission line (a wire (or pair of wires)) to carry a single channel of audio communication. Many transmission line characteristics are such that they can carry a much higher bandwidth than that of a single channel. Accordingly, a further standard telephone signalling system has been developed, known as T1. This can briefly be described as 24 separate channels multiplexed onto a signal line.

More specifically, in the T1 system, data is transmitted as frames, each frame consisting of 193 bits divided into a single frame bit followed by 24 time slots each consisting of 8 bits. Each time slot corresponds to a separate signal channel. Each frame occupies 125 µs, so that each time slot occurs at a rate of 8000/sec, matching the DS-0 word rate. Similarly, the word size (8 bits) matches the DS-0 word size. The frames in T1 are combined into multi-frames. Each multiframe can consist of 12 frames when using Superframe format (SF) or 24 frames if using Extended Superframe format (ESF). The total bit rate of the T1 signal is 1544 kbit/sec.

The T1 system can be used for transmitting digital voice signals. For this, the 24 time slots of each frame are obviously used to multiplex 24 separate voice channels into the T1 system. Control signals are accommodated in this system by an extension of the robbed bit technique used for the DS-0 system. The 6th and 12th frames of each SF format multi-frame (or the 6th, 12th, 18th and 24th frames of each ESF format multi-frame) are used for this. The last (least significant) bit of all channels in these frames are set to 0 or 1 to define two signalling bits A and B for the SF format or 4 bits A to D for the ESF format. All channels thus lose 1 bit for every 6 words.

With the T1 system, the customer premises equipment (CPE) unit will normally no longer be a part of the telephone company's equipment but will be data terminating equipment (DTE) forming part of the customer's computer or other digital data receiving system. It is however still necessary to separate functions which are concerned essentially with the telephone system from the data of interest to the customer. Accordingly, it is conventional to provide a CSU/DSU unit between the telephone line and the CPE. The CSU/DSU unit detects and responds to certain control codes, including an OCU (Office Channel Unit) code, a CSU (Channel Service Unit) code, and a DSU (Data Service Unit) code. The particular code determines the precise manner in which the CPE is supposed to respond, but for all three codes, the response involves loop-back.

This type of operation is called clear-channel T1. Loop-back here can use a simpler mechanism called DS-1 loop-back. Here a code pattern starts DS-1 loop-back, where all the incoming bits are simply looped to the outgoing bit stream until an end-of-loopback pattern is received. This is generally the type of loop-back function most DS-1 CPE support today.

Turning now to digital T1, i.e. to the use of the T1 system for transmitting purely digital data, it is often convenient to divide the DS-1 system into several channels carrying independent signals. This is achieved primarily by treating the 24 component DS-0 words of each frame as independent channels. Further, each of these DS-0 channels needs to carry certain control signals, so each of these channels is organised in the same way as the digital DS-0 system discussed above, with 7 data bits and a control bit which is normally 0 in each word giving a data rate of 56 kbit/sec.

These digital DS-0 data channels can be combined to form channels with data rates of more than 56 kbit/sec, or further divided to form channels with rates below 56 kbit/sec, but such combination or subdivision is primarily a matter for user implementation. As far as the telephone system is concerned, the DS-1 channel consists of 24 DS-0 channels which are neither further divided nor combined.

With a DS-1 system divided into digital DS-0 channels, it becomes desirable to be able to support certain DS-0 control functions for the different DS-0 channels separately, including in particular the DS-0 system's loop-back function, so that each channel of the DS-1 system can be tested individually.

In the DS-0 system, there are chips commercially available which support the loop-back function. In the DS-1 system, there are currently no chips available which support the DS-0 loop-back on the different DS-0 channels independently.

One method of implementing the DS-0 loop-back function would be to include, in the CSU/DSU unit or in the DTE, a storage register which stores the incoming word on each channel in turn, a channel counter which keeps track of the channel number, a control circuit including a latch which is set if the LSB in one of the incoming words is set (0), and control circuitry which then locks the channel counter, causes only incoming words for that channel to be stored in the storage register, and causes those words to be retransmitted on that channel. It will be realised that this circuitry is an elaboration of the circuitry described above for the DS-0 system. However, this would require major hardware redesign.

Another possible technique would be to achieve DS-0 loopback as an essentially customer software function. The standard method of dealing with digital DS-0 channels in a T1 system is for the incoming data words to be stored in a set of 24 buffers in memory, with the network control bit (the least significant bit) of each word being stripped off. To achieve DS-0 loop-back, this bit can be retained, and the customer processor (CPU) can inspect the least significant bits of the words being received. This involves the customer CPU monitoring all incoming data for loop-back codes which would impose a heavy burden of processing overhead on the CPU.

According to the present invention there is provided a telephone termination system for multi-channel digital data signalling in which each data word includes a final control bit, data is assembled as frames each containing one data word for each channel, and frames are combined into multiframes, the system comprising:
  a framer unit, settable to detect the presence of control bits in specific frames within a multiframe, and including register means for recording such control bits for each channel and flag means for indicating a change of any control bit;
  a memory including receive and transmit buffer means for each channel; and
  a processor unit responsive to an interrupt signal from the framer flag means to determine from the framer register means which channel caused the interrupt, to monitor the memory receive buffer means for that channel to determine whether the control bits for that channel represent a channel loop-back code, and to copy the receive buffer means into the transmit buffer means for that channel if the loop-back is required.

It will be seen that the present system utilises the existing CAS voice functions of a standard chip set to detect the presence of a loop-back request on any channel by a processor interrupt, with the processor then determining first which channel caused the interrupt, then checking the receiver buffer means for that channel to determine whether the interrupt is a loop-back request, and, if it is, copying the contents of the receive buffer means into the transmit buffer means to effect the required loop-back. Channel loop-back in a digital T1 system is thus achieved without requiring special purpose hardware, while the loading on the processor is minimal, since it is required only to service the loop-back function, not to detect it.

FIG. 2 illustrates a schematic diagram of the framer shown in FIG. 1.

Figure 1:
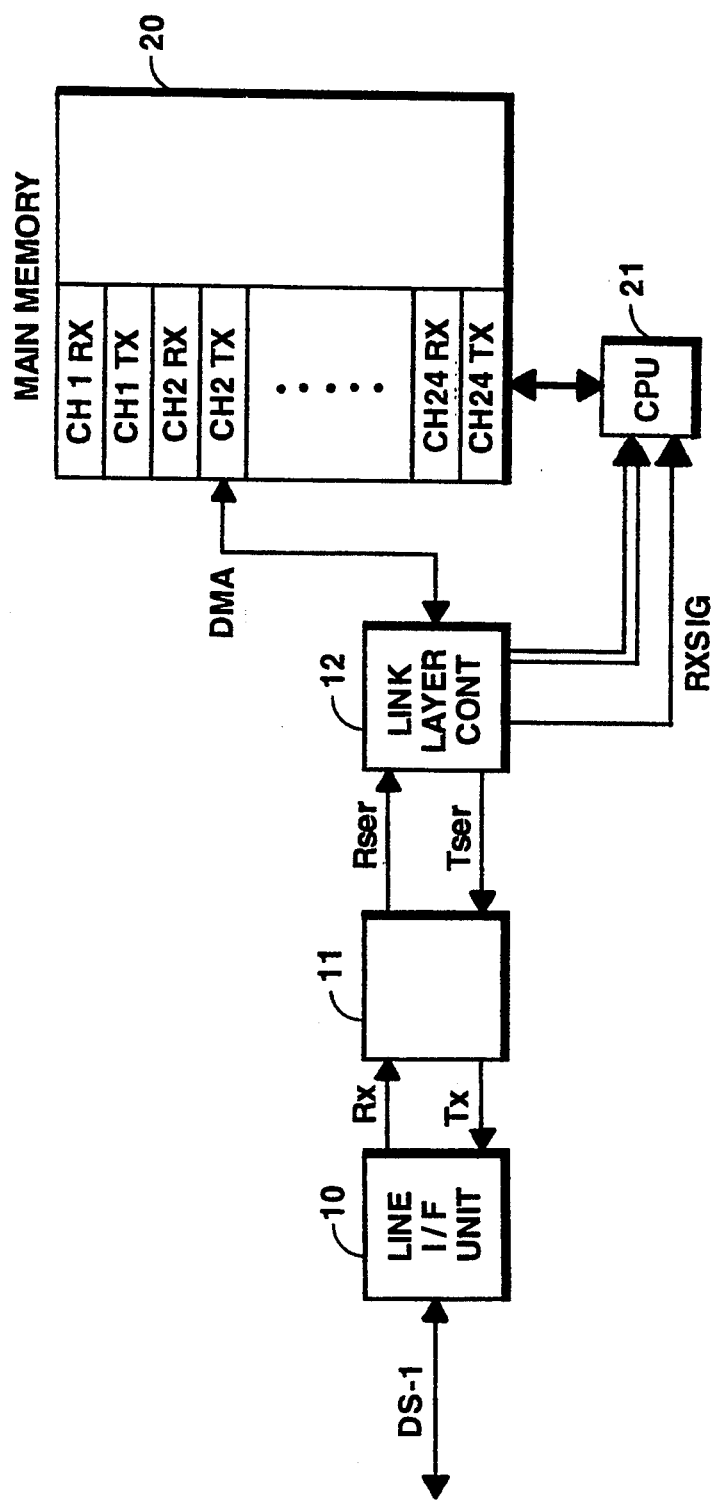
FIG. 1 illustrates a block diagram of an exemplary customer premises equipment (CPE).

A data processing system embodying the invention will now be described, by way of example, with reference to the drawing, which is a simplified block diagram of the system.

Referring to FIG. 1, a block diagram of an exemplary customer premises equipment (CPE) is shown. The telephone line DS-1 is coupled to a line interface unit 10, which is coupled by two lines $R_x$ and $T_x$ to a framer 11 which is in turn coupled by two lines Rser and Tser to a link layer controller 12. These three units 10–12 together form a standard chip set for T1. This particular set of units are a chip set known as Brooktree, units 8069B, 9170, and R8071A; it will be realised, however, that any standard chip set can be used.

A main memory 20 includes a set of 48 buffer areas CH1 RX–CH24 TX, a receive buffer area and a transmit buffer area for each of the 24 channels. Each buffer area comprises a set of linked buffers. This allows one (already full) receive buffer to undergo processing by the CPU while another buffer is in the process of being filled from the telephone line, or one (already full) transmit buffer to be in the processing of having its contents transmitted over the telephone line while another is in the process of being filled by the CPU.

The link layer controller is coupled to this set of buffer areas via a DMA (direct memory access) controller. This main-memory is also coupled in the usual way to a central processing unit 21.

The buffer size is constrained by the chip set and the CPU requirements. For the chip set here considered, the minimum buffer size allowed is 8 words. Thus with the words arriving on each channel at a rate of one every 125 µs, the time taken to fill a buffer will be at least 1 ms. For optimum CPU performance, each buffer is allowed to fill completely before being examined; also, to minimise CPU overhead, the buffer size should be large. For a buffer size of 128 words, which is in the optimum region for the CPU, the time taken to fill a buffer will be 16 ms.

Referring to FIG. 2, the framer 11 has features, including CAS functionality, designed essentially to operate with voice channel transmissions. It includes 24 4-bit registers 14, one for each channel, which together form a receive signalling register. These channel registers 14 can be enabled to respond to the CAS signalling A and B bits (or A, B, C, and D bits if the extended superframe mode is being used) which appear every 6th frame. The framer also has a flag 16 which is set on the change of any of the CAS signalling bits on any channel. This flag 16 is connected to an interrupt line to the CPU 21, as the RXSIG line. The receive signalling register is also connected (with suitable multiplexing) to the CPU 21 via a bus, so the CPU can read the contents of any of the channel registers.

In the normal state, all 24 channels of the DS-1 system are running in the 56 kbit/sec data mode, with the control (8th) bit of every word set to 1. Only 7 bits are effectively being received per word for each channel, as the control bit (1) is discarded.

All the channels have receive signalling enabled (i.e. the voice transmission CAS receive functions enabled). That means that the A, B, C, and D bits are all set to 1 in the receive signalling register (not shown) in the framer 11. With receive signalling enabled, this register is updated with the last received A, B, C, and D bits at the end of every extended superframe (or the A and B bits if plain superframe signalling is being used). This means that the worst case (i.e. the longest time) for the detection of a 0 signalling bit is 1.5 ms for SF and 3 ms for ESF.

DDS loop-back is required to operate upon the receipt of a minimum of 4 consecutive bytes of the loop-back code (as defined in the table) and remains in operation as long as every other byte contains the loop-back code and for a minimum of four consecutive bytes after the receipt of the last code word. Once loop-back is in operation the CPE must return the receive data back through the transmit path in the same order as it was received except each loopback code must be mapped to its return code. The carrier will repeat the loop-back code word for a minimum of 1 sec before it requires to see a mapped code word returned.

The start of DS-0 loop-back on a single channel is signalled by one of the loop-back codes given above. This is detected by the framer 11, which checks the last bit of every 6th frame on all channels. (The framer can be set to detect any desired combination of the A, B, C, and D bits). This changes the status of a signalling bit on one of the channels. The change of status of that bit for any channel sets the signal RXSIG with negligible delay, and the RXSIG signal is fed as an interrupt to the CPU 21.

Once the CPU detects an RXSIG interrupt signal, it interrogates the receiver signalling register in the framer to determine which channel caused the interrupt and changes that channel from the normal 56 kbit/sec mode to a 64 kbit/sec non-HDLC mode. RX signalling is also disabled for this channel, to prevent further interrupts being generated if further signalling bits are detected as changing from 1 to 0.

The change of mode ensures that the receive buffer for that channel is thereafter fed with all 8 bits of the received words on that channel. Before that, only 7 bits were being received (or no bits, if the channel was in the HDLC mode, as no HDLC mode flag would have been detected by the receiver).

When an RXSIG signal has been detected for a channel, that channel must be monitored to determine whether the interrupt signal was caused by a loop-back code. A loop-back is initiated if at least 4 successive bytes contain one of the loop-back codes listed above. As noted above, the method of operation requires each buffer to be completely filled before it is checked, with the checking being performed while the next buffer is being filled. The CPU therefore checks the buffer for this condition when the buffer is full. If the CPU fails to find this condition, the channel is put back into the 56 kbit/sec mode or an error processing sequence is initiated.

Once the DS-0 loop-back condition has been detected, the channel it was found on has its transmitter changed to the 64 kbit/s non-HDLC mode, and the transmit buffer for that channel must then be filled from the receive buffer by the CPU, with each DS-0 loop-back code being converted to the mapped form shown in the table above. The transmit buffers must be large enough to allow the CPU to maintain constant transmission; the precise size can be varied, but a size of 128 words is convenient. There will be a delay in filling the transmit buffer, dependent on its size; for the system described here, this delay will be about 1 ms.

Once the loop-back has been initiated, the receiver data is continuously looped back to the transmitter on the relevant DS-0 channel, with the loop-back codes mapped to the return codes. The transmitter will then start sending loop-back words and random data words alternately. The receiver will continue to loop back the received data until a sequence of 4 bytes is found containing no loop-back code. This indicates termination of loop-back and the receiver and transmitter are changed back to their previous 56 kbit/s mode once the last transmit buffer containing loop-back codes has been sent with receive signalling re-enabled for that channel.

For DS-0 loop-back, return of the mapped loop-back codes should start within 1 sec at most. It will be seen that the worst case time required by the present system to initiate loop-back code return is the sum of the CPU interrupt time, the receive buffer processing time, the receive channel mode change time, the transmit buffer processing time, and the transmit channel mode change time. These times are 3 ms, 1 ms, 16 ms, 1 ms and 2 ms respectively, giving a total of 23 ms. The maximum allowable latency for the CPU is therefore 977 ms if this 1 s loop-back time condition is to be met.

It will be realised that the system can be extended to cover the detection of any DS-0 code word which is repeated often enough to allow a receiving signalling bit to detect it and be set. This may require a minimum of 6 repetitions, but this number needs to be increased to allow for CPU latency and the changing of the channel's receive mode from 56 kbit/s to 64 kbit/sec non-HDLC mode.

The reliability can be increased by requiring all the signalling bits to be 0 before switching the channel into 64 kps non-HDLC data mode. This reduces the chance of triggering the search for a code if a control bit is changed to 0 by noise on the line, without adding significant overhead to the detection time.

It will be realised that in the present system, the performance of the loop-back function involves the customer CPU and main memory, so the channel integrity is tested right up to those customer units.

I claim:

1. A telephone termination system for multi-channel digital data signalling in which each data word includes a final control bit, data is assembled as frames each containing one data word for each of twenty-four channels, and frames are combined into multi-frames, said multi-frames being of SF format or ESF format, the system comprising:

a framer unit, settable to detect the presence of control bits (A and B, or A, B, C, and D) in specific frames (6th and 12th, or 6th, 12th, 18th, and 24th) within a multi-frame, and including a register means for recording such control bits for each channel and a flag means for indicating a change of any control bit;

a memory including a receive buffer means and a transmit buffer means for each of twenty-four channels; and a processor unit responsive to an interrupt signal (RXSIG) from the framer flag means to determine from the framer register means which channel caused the interrupt signal, to monitor the memory receive buffer means for that channel to determine whether the control bits for that channel represent a channel loop-back code, and to copy the receive buffer means into the transmit buffer means for that channel if the loop-back is required.

2. The telephone termination system according to claim 1 wherein, the main processor converts the loop-back codes to mapped form in copying them onto the transmit buffer.

3. The telephone termination system according to claim 2 wherein the main processor only detects a loop-back condition on detecting at least four successive loop-back code words.

4. The telephone termination system according to claim 3 wherein, on initiating the loop-back operation, the main processor monitors the receive buffer for loop-back words and terminates loop-back on detecting four successive words which are not loop-back code words.

5. The telephone termination system according to claim 4 wherein, the main processor detects any DS-0 code word which is repeated four times and then performs a function for the channel on which the DS-0 code word appeared.

6. The telephone termination system according to claim 5 in which the multi-channel signalling system is a T1 system and the channels are DS-0 channels.

7. The telephone termination system according to claim 1 wherein the main processor only detects a loop-back condition on detecting at least four successive loop-back code words.

8. The telephone termination system according to claim 7 wherein, on initiating the loop-back operation, the main processor monitors the receive buffer for loop-back words and terminates loop-back on detecting four successive words which are not loop-back code words.

9. The telephone termination system according to claim 8 wherein, the main processor detects any DS-0 code word which is repeated and then performs a function for the channel on which the DS-0 code word appeared.

10. The telephone termination system according to claim 9 in which the multichannel signalling system is a T1 system and the channels are DS-0 channels.

11. The telephone termination system according to claim 1 wherein, on initiating the loop-back operation, the main processor monitors the receive buffer for loop-back words and terminates loop-back on detecting four successive words which are not loop-back code words.

12. The telephone termination system according to claim 11 wherein, the main processor detects any DS-0 code word which is repeated and then performs a function for the channel on which the DS-0 code word appeared.

13. The telephone termination system according to claim 12 in which the multichannel signalling system is a T1 system and the channels are DS-0 channels.

14. The telephone termination system according to claim 1 wherein, the main processor detects any DS-0 code word which is repeated and then performs a function for the channel on which the DS-0 code word appeared.

15. The telephone termination system according to claim 14 in which the multichannel signalling system is a T1 system and the channels are DS-0 channels.

16. The telephone termination system according to claim 1 in which the multichannel signalling system is a T1 system and the channels are DS-0 channels.

* * * * *